Figure 1:
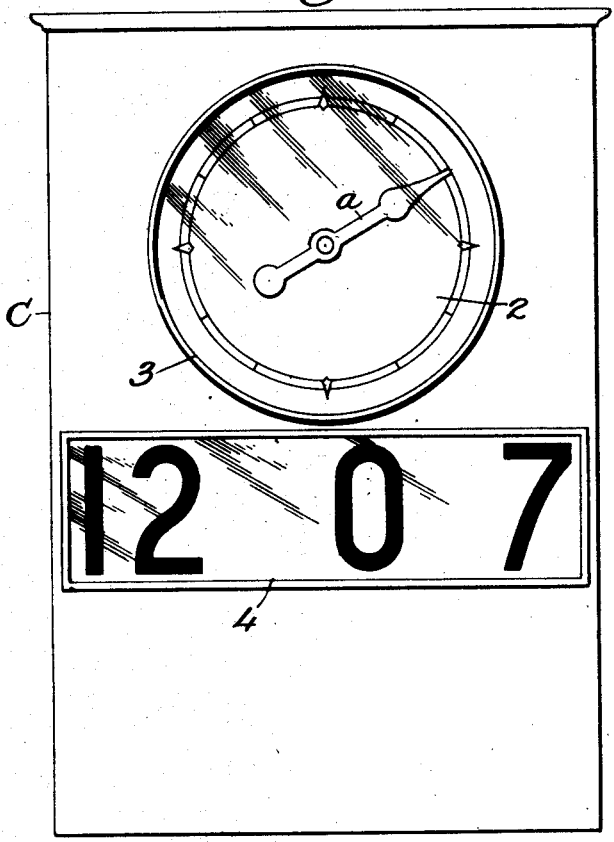

J. S. KENNEDY.
CLOCK.
APPLICATION FILED AUG. 13, 1909.

1,044,534.

Patented Nov. 19, 1912.

4 SHEETS—SHEET 1.

WITNESSES:

INVENTOR

ATTORNEY

J. S. KENNEDY.
CLOCK.
APPLICATION FILED AUG. 13, 1909.

1,044,534.

Patented Nov. 19, 1912.

4 SHEETS—SHEET 2.

WITNESSES:

INVENTOR

ATTORNEY

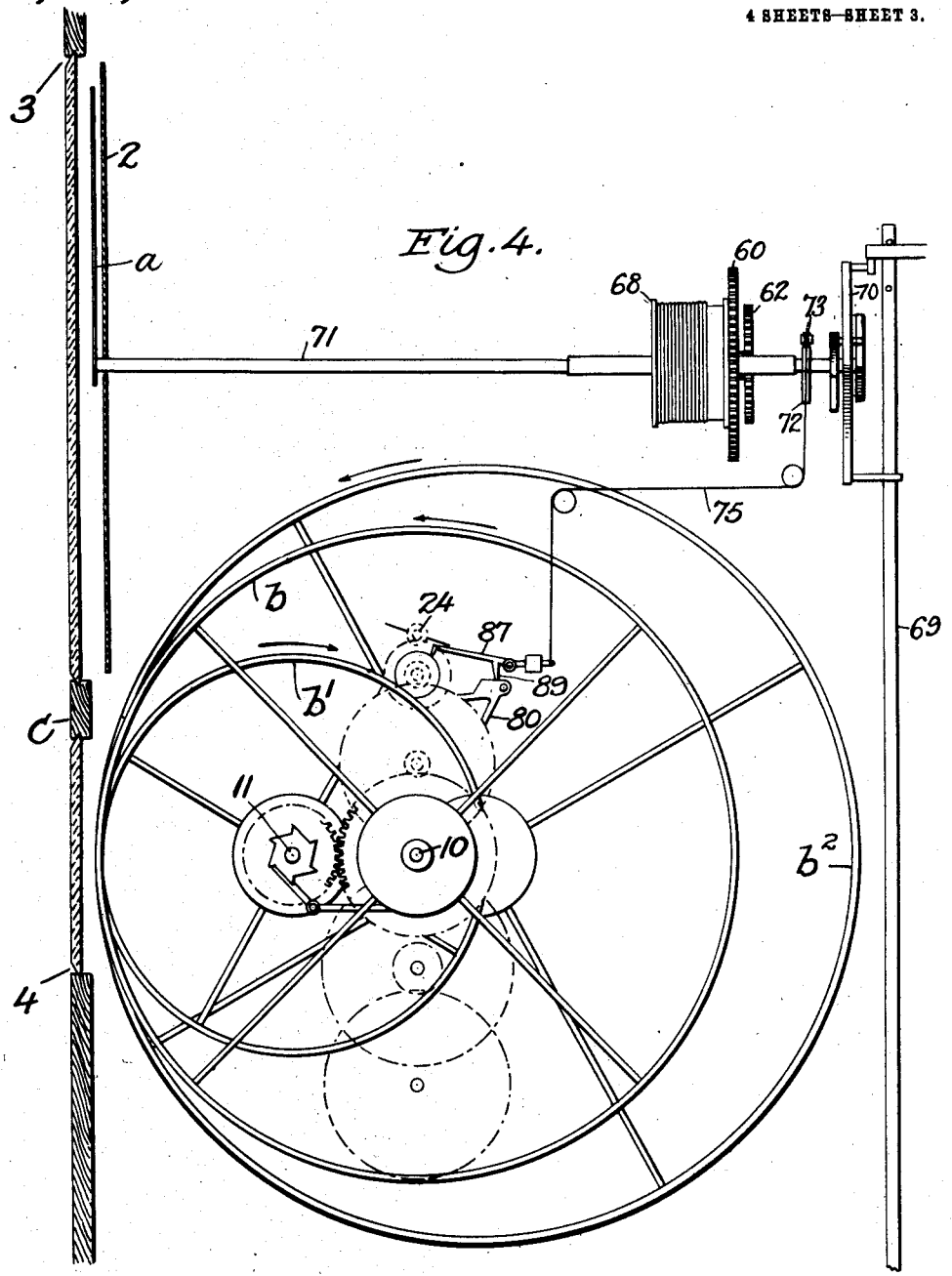

J. S. KENNEDY.
CLOCK.
APPLICATION FILED AUG. 13, 1909.

1,044,534.

Patented Nov. 19, 1912.
4 SHEETS—SHEET 4.

WITNESSES:
James T. Duhamel
A. L. Kent

INVENTOR
James S. Kennedy
ATTORNEY

UNITED STATES PATENT OFFICE.

JAMES S. KENNEDY, OF NEW YORK, N. Y.

CLOCK.

1,044,534.   Specification of Letters Patent.   Patented Nov. 19, 1912.

Application filed August 13, 1909. Serial No. 512,663.

*To all whom it may concern:*

Be it known that I, JAMES S. KENNEDY, a citizen of the United States of America, residing at New York city, in the county of New York and State of New York, have invented certain new and useful Improvements in Clocks, of which the following is a specification, reference being had therein to the accompanying drawing.

This invention relates especially to clocks of large size intended to be viewed from a distance, such as clocks for public places, factories, and the like. The indicating devices of such clocks being of comparatively large size and considerable weight, require a correspondingly considerable power to operate them. In such clocks as heretofore made the aim has been to provide for the indication of hours and minutes, but particular attention has not been given, so far as I am aware, to providing a clock which will indicate the time accurately to within, say, one or two seconds to persons at a considerable distance therefrom.

The object of the present invention is generally to provide a clock of the kind referred to which shall be accurate and reliable in operation, of simple and substantial construction, and by which time may be indicated within the degree of accuracy above mentioned to persons at a considerable distance therefrom.

A further object of the invention is to provide a clock in which a definite relation shall be preserved between the minute indicating means and the seconds indicating means.

A further object of the invention is to provide a clock with straight reading indicating devices or means for showing the hours and minutes, and with a revolving seconds hand for indicating the seconds on a dial plate, and with the several indicating devices timed so that the hour and the last minute elapsed will always be indicated by the figures of the straight reading indicating devices, and the fractional part of the current minute will be indicated by the seconds hand.

A further object of the invention is to provide means whereby the several indicating devices may be operated at all times with the expenditure of a minimum amount of energy.

To the above ends, the invention consists in various constructions, arrangements and combinations of parts as hereinafter described and pointed out in the claims.

As a full understanding of the invention can best be given by a detailed description of a preferred construction embodying the various features thereof, such a description will now be given in connection with the accompanying drawings showing such a preferred construction, and in which—

Figure 3:
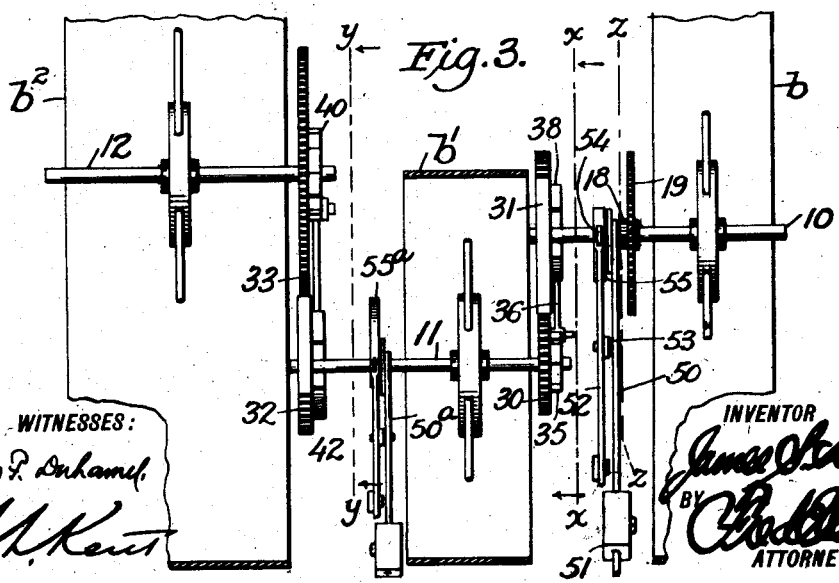
Figure 2:
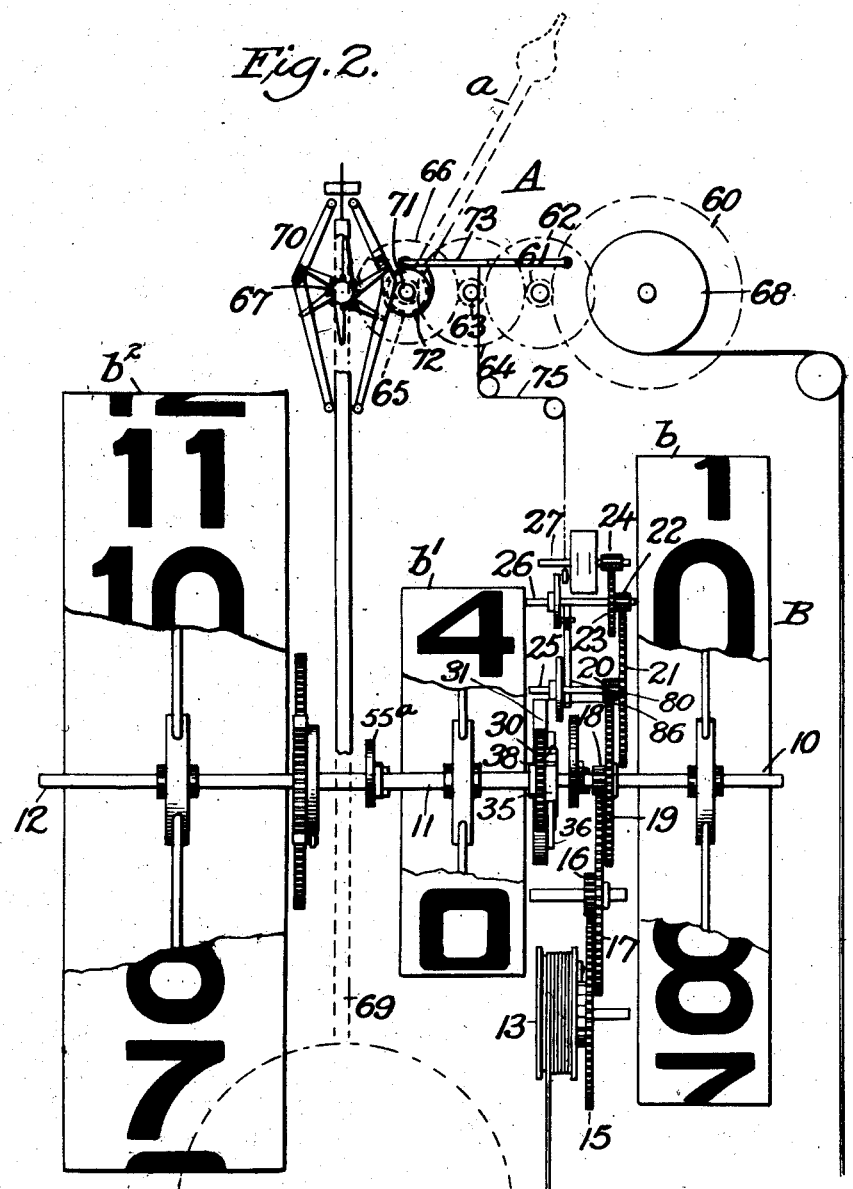
Figure 5:
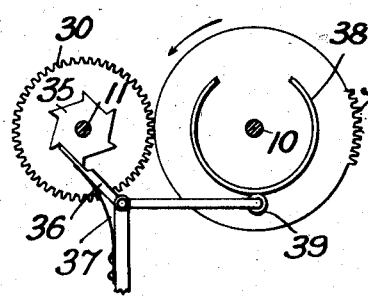
Figure 6:
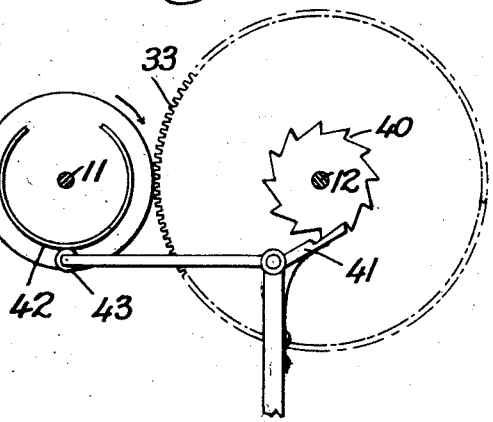
Figure 7:
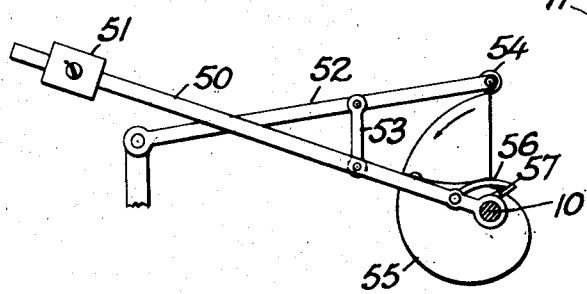
Figure 8:
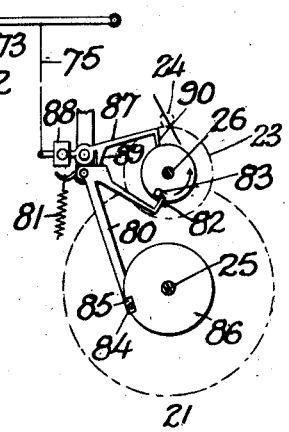
Figure 9:
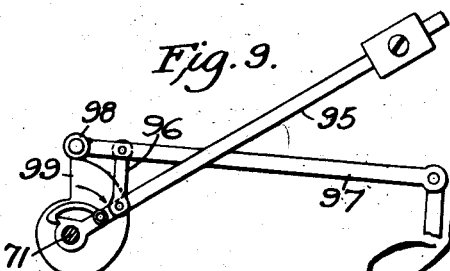

Figure 1 is a front outside view of the clock, showing the exposed portions of the hour and minute indicating devices and the seconds indicating hand and dial. Fig. 2 is an enlarged front view of the operating mechanism with parts broken away, and with the supporting structure and bearings and certain other parts of the mechanism omitted for the sake of clearness in the showing. Fig. 3 is a plan view, partly broken away, of the hour and minutes indicating drums and parts of their operating and connecting devices. Fig. 4 is a side view of the mechanism shown in Fig. 2 with parts omitted and showing also the seconds dial and part of the front of the clock casing. Fig. 5 is a detail view of the driving and controlling connection between the shafts of the first and second minute indicating drums. Fig. 6 is a similar view of the driving and controlling connection between the shaft of the second minute indicating drum and the shaft of the hour indicating drum. Fig. 7 is a detail view of the power accumulating device by which power is accumulated during nine movements of the first minute indicating drum and is delivered during the tenth movement thereof at which time the second minute indicating drum is also being moved. Fig. 8 is a detail view of the release and stop mechanism whereby the operation of the first minute indicating drum is controlled by the time mechanism. Fig. 9 is a view similar to Fig. 7 but showing the power accumulating device on the shaft of the seconds hand for accumulating power during part of the rotation of said shaft and for delivering power during the part of the rotation of said shaft in which the time movement is doing work in operating the releasing mechanism shown in Fig. 8.

The clock consists of two parts driven by separate sources of power, namely, a time movement A which drives a seconds hand *a*, and an intermittent movement B which is controlled by the time movement and which drives three drums $b$, $b'$ and $b^2$ which are provided on their peripheries with figures for indicating the units of minutes, tens of minutes, and hours, respectively. The seconds hand $a$ moves in front of and indicates the seconds on a dial 2 which is mounted to show through a sight opening 3 in the casing C of the clock, and the drums $b$, $b'$ and $b^2$ are mounted to show the figures on their peripheries one at a time for each dial through a sight opening 4 in the front of the casing C, which sight opening 4 as shown is arranged below the sight opening for the seconds dial. The sight openings may be provided with glass as shown in the drawing. Referring now to the intermittent movement and the indicating drums which are driven thereby, these drums $b$, $b'$, $b^2$, are carried by shafts 10, 11 and 12 respectively. The right hand drum $b$ has marked on its periphery figures representing ten consecutive numbers running from 0 to 9 inclusive for indicating the unit number of minutes. The second drum $b'$ has its periphery marked with figures representing six consecutive numbers running from 0 to 5 inclusive for indicating the tens of the numbers of minutes to be indicated. The third drum $b^2$ has its periphery marked with figures representing twelve consecutive numbers running from 1 to 12 inclusive for indicating the hours. The figures on the several drums are preferably all of the one size and the drums of different sizes corresponding to the number of figures which they carry on their periphery, and the drum shafts 10, 11 and 12 are set in different vertical planes so that the portions of the peripheries to be viewed through the sight opening 4 will be at substantially the same distance behind the sight opening.

The shaft 10 is under a constant tendency to rotate under the influence of a weight driven drum 13, power from which is transmitted through gears 15, 16, and 17 to a pinion 18 on the shaft 10. This train of gearing is extended by gear 19 on the shaft 10 and gears 20 to 24, driving shafts 25 and 26 and a fan shaft 27. This train of gearing is normally held in check by a stop and release mechanism controlled by the time movement, and is released at the end of every minute indicated by the seconds hand and allowed to operate sufficiently to cause the shaft 10 to make just one-tenth of a rotation.

The shaft 11 bearing the drum $b'$ is caused to make one-sixth of a rotation at every tenth movement of the shaft 10; or, in other words, is caused to move sufficiently to shift its figure behind the sight opening once for each complete rotation of the drum $b$ and at the time of the last shifting movement of the drum $b$ in each of its rotations. For the purpose of so operating the drum $b'$, its shaft 11 carries a gear 30 which meshes with and is intermittently driven by a segment gear 31 on the shaft 10. The pitch diameters of gears 31 and 30 are in the ratio of 10 to 6, so that if the gear 31 were extended through the 360 degrees of the circle and had, say, 100 teeth, then the gear 30 would have sixty teeth. The gear 31 extends, however, only through a segment of one-tenth of a circle so that it will mesh with and drive the gear 30 and drum $b'$ one-sixth of a revolution during one-tenth of each full rotation of the shaft 10. The position of the segment gear 31 angularly on the shaft 10 is such that it will mesh with and drive the gear 30 and drum $b'$ during that movement of the drum $b$ which moves the figure 9 beyond the sight opening and brings the figure 0 into position behind the sight opening.

Similarly, the drum $b^2$ which carries the hours figures is caused to make one shifting movement of one-twelfth of a rotation for each complete rotation of the drum $b'$, each shifting movement of the drum $b^2$ taking place during the one of the six movements of a complete rotation of the drum $b'$ by which the figure 5 on the drum $b'$ is moved beyond the sight opening and the figure 0 brought into position behind the sight opening. Such movement is given to the drum $b^2$ from the shaft 11 through segment gear 32, which at each sixth movement of the shaft 11 meshes with and drives a gear 33 on the shaft 12. The pitch diameters of gears 32 and 33 are as 6 to 12, or 1 to 2, and the gear 32 extends over a segment of one-sixth of a circle, and the position of this segment gear 32 angularly on the shaft 11 is such that it will mesh with and drive the gear 33 during the movement of the shaft 11 by which the drum $b'$ is shifted to bring the figure 0 into position behind the sight opening. The gear 33 will thus be driven to shift the drum $b^2$ one-twelfth of a rotation at each movement of the drum $b'$ by which the figure 0 is brought into position behind the sight opening.

The relative movements of drums $b$, $b'$ and $b^2$ will thus be such that with the drum $b$ moving to expose a new unit minute figure once each minute, the drum $b'$ will be moved through one-sixth of a revolution at the end of every ten minutes to expose a new figure through the sight opening at the time that the figure exposed by the drum $b$ is changed from 9 to 0, and the drum $b^2$ will be moved at the end of every hour to expose a new hour figure at the sight opening at the time that the drum $b'$ is moved to change its exposed figure from 5 to 0.

In order to prevent movement of the drums $b'$ and $b^2$ except at the desired times, locking means are provided for holding these drums stationary during the intervals when the gear 31 is not in engagement with the gear 30 and gear 32 is not in engagement with the gear 33. For this purpose, in the construction shown, (see Fig. 5) the shaft 11 of the drum $b'$ carries fixed thereon a ratchet wheel 35 having six teeth, and a pawl lever 36 is pivotally mounted in position to engage the ratchet wheel and pressed into operative position as by a spring 37. The pawl lever is locked to hold the ratchet wheel and shaft 11 against turning during nine consecutive movements, or nine-tenths of each complete rotation, of the shaft 10 by means of a cam flange 38 on the face of the gear 31 against which rides a roller 39 carried by one arm of the pawl lever. The cam 38 is cut away for a distance equal to one-tenth of its circumference plus the diameter of the roll 39, and this cut off portion or notch in the cam is positioned so that the pawl lever will be released to unlock the shaft 11 during the time that the gear 31 is in engagement with the gear 30. Similar locking means are provided for the shaft 12 and drum $b^2$ controlled by the rotation of the shaft 11. In this case, however, as shown in Fig. 6, the ratchet wheel 40 on the shaft 12 has twelve teeth, and the pawl lever 41 which engages this ratchet wheel is held locked in operative position to prevent movement of the shaft 12 and the drum $b^2$ by means of a cam flange 42 on the gear 32 during five consecutive movements of the shaft 11 and drum $b'$, and is released at each sixth movement during which the gear 32 is in engagement with the gear 33.

At each movement of the drum $b'$ occurring once every ten minutes it is evident that more power is required than when drum $b$ is moving alone. Similarly once every hour when drum $b^2$ is moved there is still further additional power required. It is desirable, therefore, to provide means for furnishing the power required to operate the drums $b'$ and $b^2$ at the times when these drums are shifted without having an excessive amount of power employed during the time that these drums remain stationary. For this purpose power accumulating devices are provided by which power is accumulated in the intervals between the movements of the drums $b'$ and $b^2$ and delivered at the proper time for operating these drums. Two such power accumulating devices are preferably provided, one for accumulating and delivering power for the movement of the drum $b'$ and one for the drum $b^2$. Devices of a preferred form for accomplishing this purpose are shown in the drawings; the one for supplying power for operating the shaft 11 being shown in detail in Fig. 7. This device comprises a lever 50 loosely pivoted on the shaft 10 and carrying an adjustable weight 51. This lever is supported and gradually raised during nine successive movements or nine-tenths of each complete rotation of the shaft 10 by means of a lever 52 connected with the lever 50 by a link 53 and pivoted at one end to a stationary support and carrying at the other end a roll 54 which runs on the periphery of a cam 55. This cam 55 is fast on the shaft 10 and is formed to gradually raise the lever 52 and thereby the lever 50 through nine-tenths of each rotation of the shaft 10 and to allow the levers to fall through the remaining one-tenth of each rotation of the shaft 10 until the roll 54 strikes the low point of the cam. The pitch of the cam and the length of the lever 52 and the position of the connecting link 53 are such that the lever 50 will be raised by the cam through an angle of 36°, and the cam is preferably so shaped that the lever 50 will be raised through an angle of 4° or one-ninth of 36° during each of the successive nine movements of the shaft 10 during which the cam operates to raise the lever. The lever 50 carries a pawl 56 in position to engage a tooth 57 on the shaft 10 to clutch the lever to the shaft just before the high point of the cam moves from under the cam roll to allow the levers to drop.

The position of the cam 55 angularly on the shaft 10 is such that the high point of the cam will move from under the cam roll 54 at the beginning of that movement of the shaft 10 during which the shaft 11 is driven through the engagement of the gear 31 with the gear 30. With these parts so constructed and arranged, at each movement of the shaft 10 by which the drum $b$ is shifted to bring the figures 1 to 9 successively into position opposite the sight opening, the lever 50 will be raised through an angle of 4°, and at the end of the ninth movement the lever 50 will have been raised through an angle of 36° or one-tenth of a circle and the parts will be in the position shown in Fig. 7. At the next movement of the shaft 10 and drum $b$ by which the figure 0 on the periphery of the drum is brought into position opposite the sight opening, the high part of the cam 55 will move from under the cam roll 54, and the lever 50 will thus be allowed to fall through an angle of 36° or one-tenth of a circle, and since the lever is clutched to the shaft 10 through the engagement of the pawl 56 with the tooth 57 the power of the falling weighted lever will aid in driving the shaft 10 during the one-tenth of a revolution of such shaft during which it is driving the shaft 11 and drum $b'$.

The power accumulating device by which power is delivered for aiding in moving the drum $b^2$, as shown in Figs. 2 and 3, is similar to the device shown in Fig. 7 and above described, except that its cam $55^a$ on the shaft 11 is formed to raise its weighted lever $50^a$ through five successive movements of the shaft 11, and the cam and levers and connecting link are proportioned so that by such five movements the lever 50ᵃ will be raised through an angle of 60° or one-sixth of a circle. By this device, therefore, at each movement of the shaft 11 and drum b' during which the drum b² is not moved, the lever 50ᵃ will be raised, and at the end of the five movements of the shaft 11 during which the drum b² remains stationary the lever 50ᵃ will have been raised through an angle of 60° or one-sixth of a circle. Then at the next movement of the shaft 11 and drum b' by which the figure 0 on the periphery of the drum b' is moved into the position opposite the sight opening, the lever 50ᵃ will be allowed to fall through an angle of 60° or one-sixth of a circle, and the lever being at that time clutched to the shaft 11 the power of the falling weighted lever will aid in driving the shaft 11 during the one-sixth of a revolution of such shaft during which it is driving the shaft 12 and drum b². By providing these power accumulating devices as above described, the power required to be delivered by the driving drum 13 will be only such as is necessary for driving the drum b and operating the lifting cam 55. The power of the weighted lever 50 should obviously be sufficient to supply the extra power required for operating the drum b' and the lifting cam 55ᵃ, and the power of the weighted lever 55ᵃ will be such as to supply the additional power required to operate the drum b².

Referring now to the time movement, Figs. 2 and 4, this movement consists of an ordinary train of gears 60, 61, 62, 63, 64, 65, 66 and 67 driven by a weight driven drum 68 and controlled in its movement by a pendulum 69 and escapement 70. Any suitable form of escapement may be used, but on account of the size and weight of the seconds hand to be operated and the amount of power necessary to drive the same and to control the intermittent movement, as hereinafter described, a suitable gravity escapement is preferably employed, and I find the form of escapement indicated in the drawings and which is known as Dennison's double three-legged gravity escapement to be well adapted for the purpose. The ratio of the gears 66 and 67 which connect the seconds hand shaft 71 and the escapement shaft, and the period of oscillation of the pendulum, must of course be such as to cause the seconds hand shaft 71 to make one revolution in exactly one minute of time.

As before stated, the time movement, in addition to driving the seconds hand, also controls the operation of the intermittent movement which drives the drums b, b' and b². For this purpose, the seconds hand shaft 71 carries a cam 72 fast thereon, the periphery of which as shown is concentric with the shaft for about three-quarters of its circumference and then rises for about the remaining one-quarter of the circumference and then drops sharply away again. This cam serves to operate a lever 73 pivoted at one end and provided at the other end with a cam roll running on the periphery of the cam. The angular position of the cam 72 on the shaft 71 is such that the lever 73 is allowed to drop from the high point of the cam as the seconds hand reaches its vertical position, or the position in which it points to the zero mark on the dial. The motion of the lever is transmitted through a cord or other suitable means to operate the release and stop mechanism by which the intermittent movement is controlled.

A preferred form of release and stop mechanism for controlling the operation of the driving train which drives the drums is shown in detail in Fig. 8, and comprises a pivoted forked stop lever 80 under tension of a spring 81 which tends to move the lever to carry the bent end or toe 82 of one arm of the lever into position to intercept the movement of a pin 83 carried by a disk on the shaft 26. The other arm of the forked stop lever carries a pin 84 which, when the driving train is held against movement by the bent end 82 of the lever engaging the pin 83, rests in a notch 85 in the periphery of a disk 86 on the shaft 25. A releasing lever 87, normally held in the position shown in Fig. 8, as by a weight 88, is provided with a heel 89 in position to engage a shoulder on the forked stop lever when the lever 87 is thrown downward and with a bent end or toe 90 adapted to move into the path of the pin 83. The ratio of gear 19 to pinion 20 is 10 to 1, so that the gear 19 and shaft 10 will make one-tenth of a rotation for each complete rotation of the shaft 25 which carries the notched disk 86. The number of teeth in gear 21 must be an even multiple of the number of teeth in pinion 22 so that the disk which carries the stop pin 82 will make an even number of rotations for each complete rotation of the disk 86. Fig. 8 shows the position of the parts of this release and stop mechanism when the drum b is at rest and the low or concentric portion of the cam 72 is toward the cam roll on the lever 73.

The operation of the releasing and stopping mechanism is as follows: As the seconds hand approaches the zero point toward the end of each complete rotation of the shaft 71, the lever 73 is raised by the cam 72 and through the cord 75 raises the left hand end of the releasing lever 87, thereby throwing the right hand end of the releasing lever downward to cause the forked stop lever to be moved by the wheel 89 against the tension of its spring so as to withdraw the pin 84 out of the notch of the disk 86 and to move the toe 82 of the stop lever out of the path of the stop pin 83. The disk carrying the stop pin 83 will then be free to move in the direction of the arrow in Fig. 8, but will make only a short movement when the stop pin will be intercepted by the toe 90 of the releasing lever which has been moved downward into the path of the pin. This movement which corresponds to the "warning" given by the striking train of a clock is sufficient, however, to permit the notch 85 in disk 86 to be carried beyond the pin 84 on the stop lever. The operating train of the intermittent movement will then remain stationary until by the further movement of the shaft 71 of the time movement the seconds hand has been moved to the zero position, at which time the high point of the cam 72 will move from under the cam roll on the lever 73, and the releasing lever 87 will be allowed to return to its normal position under the influence of its weight 88 to withdraw its toe 90 out of the path of the stop pin 83. The disk carrying the stop pin is thereby permitted to rotate, and, the pin 84 riding on the periphery of the disk 86, the motion of the operating train will continue until the shaft 25 and disk 86 have made one full rotation, and the notch 85 again comes opposite the pin 84 on the stop lever, whereupon the stop lever will be moved under the tension of its spring 81 to carry the pin 84 into the notch 85 and to move the toe 82 into the path of the stop pin 83. The motion of the train will then be interrupted when the pin 83 comes against the toe 82, the parts coming to rest in the position shown in Fig. 8. The driving train of the intermittent motion will then be held locked against movement until the completion of another rotation of the seconds shaft 71.

The intermittent motion will thus be released at the end of each minute when the seconds hand is pointing to the zero mark on the dial, and at each release the operation of the intermittent movement will be just sufficient to cause the shaft 10 and drum $b$ to make one-tenth of a rotation.

In order to equalize the load on the shaft 71 throughout its entire rotation, it is desirable to provide a power accumulating device which will operate to accumulate power during the major part of each rotation of the shaft during which the concentric portion of the cam 72 is running beneath the cam roll of the lever 73 and to deliver power to aid in driving the shaft 71 during the time that the cam 72 is operating to raise the lever 73. This power accumulating device may to advantage be similar to the accumulating devices connected with the shafts 11 and 12. Such a device is shown in detail in Fig. 9 and comprises a weighted lever 95 loosely pivoted on the shaft 71 and supported by a link 96 from a lever 97 which is pivoted at one end to a stationary support and carries at the other end a roll 98 which runs on the periphery of a cam 99 fast on the shaft 71 and which is formed to gradually raise the levers 97 and 95 during the first three-quarters of each rotation of the shaft 71; that is, while the concentric portion of the cam 72 is running beneath the roll on the lever 73, and to allow the levers 95 and 97 to fall during the remaining one-quarter of each rotation of the shaft 71. The lever 95 and shaft 71 are provided with means, such as the pawl and tooth shown in Fig. 9, whereby the lever will be clutched to the shaft when it has been raised to the highest point by the cam 99. The pitch of the cam and the length of the lever 97 and the position of the connecting link are such that the lever 95 will be raised by the cam through an angle corresponding to the angular movement of the shaft 71 while the lever 73 is being raised by the cam 72; that is, in the construction shown, the lever 95 should be raised through an angle of about 90° or one-quarter of a circle.

The operation of the mechanism as a whole will be understood from the foregoing description and statements of the operations of its parts.

It is to be understood that the invention is not to be limited to the exact constructions, arrangements and combinations of parts as shown in the drawings and to which the foregoing description has been mainly confined, but that it includes changes and modifications thereof within the claims. It will also be understood that features of the invention as claimed may be used independently of other parts or features of the construction shown, and in constructions differing widely as a whole from that shown.

What is claimed is:

1. In a clock, the combination of a rotary indicating device for indicating the units of minutes, a driving train therefor, a second rotary indicating means for indicating tens of minutes, a segment gear moving with the first indicating device, a gear adapted to be engaged by said segment gear for causing the second indicating device to make a partial rotation at the end of each ten minutes indicated by the first indicating device, a third indicating device for indicating hours, a second segment gear moving with the second indicating device, a gear adapted to be engaged by said second segment gear to cause the third indicating device to make a partial rotation at each sixth movement of the second indicating device, a power accumulating device for supplementing the power of the driving train for moving the second indicating device, and a power accumulating device for supplying power to aid in operating said third indicating device.

2. In a clock, the combination of an intermittently operating rotary time indicating device, a second intermittently operating rotary time indicating device, a gear on the shaft of the second indicating device, a segment gear on the shaft of the first indicating device adapted to engage said first mentioned gear to move the second indicating device one step during the last step of each complete rotation of the first indicating device, a ratchet wheel on the shaft of the second indicating device, a locking pawl for engaging said ratchet wheel, and a cam on the shaft of the first indicating device for locking said pawl in operative position, said cam being formed to release the pawl during the engagement of said gears.

3. In a clock, the combination with an intermittently moving indicating device, of a driving and controlling connection for said indicating device comprising a segment gear 31, a gear 30 adapted to be engaged by the segment gear and to be turned thereby to operate the second indicating device, a ratchet wheel 35, a pawl 36 adapted to engage the ratchet wheel to hold the second indicating device against movement, and a cam 38 moving with the segment gear for holding the pawl in operative position during the time that the gears are disengaged.

In testimony whereof I affix my signature in presence of two witnesses.

JAMES S. KENNEDY.

Witnesses:
 JEANNETTE STORK,
 A. L. KENT.